Jan. 21, 1936.  H. C. STOCKDALE  2,028,297
APPARATUS FOR BAGGING ROLLABLE ARTICLES
Filed March 10, 1933
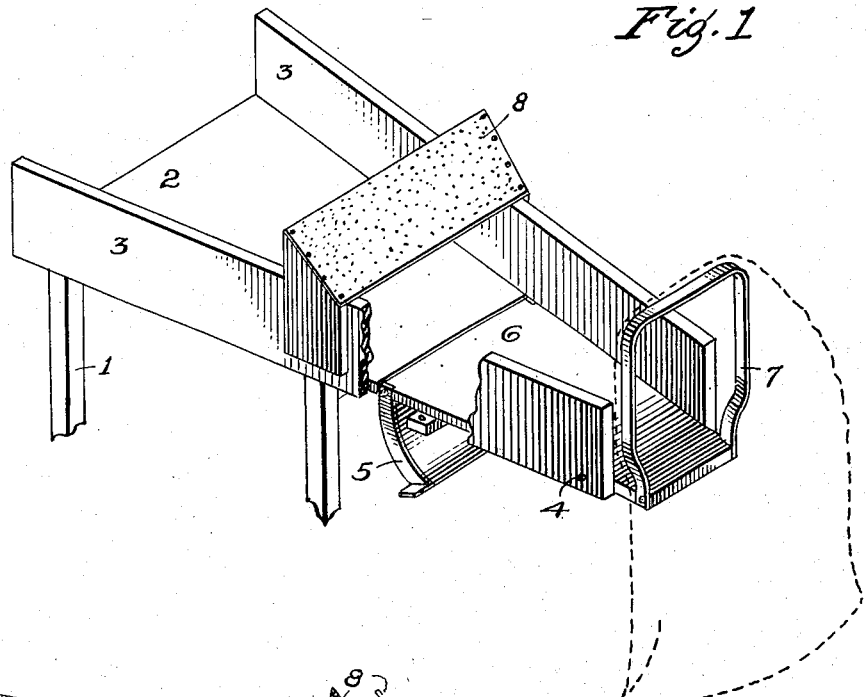
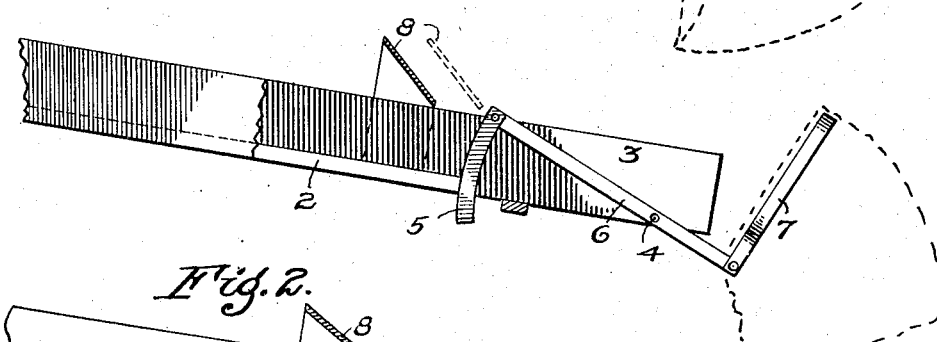
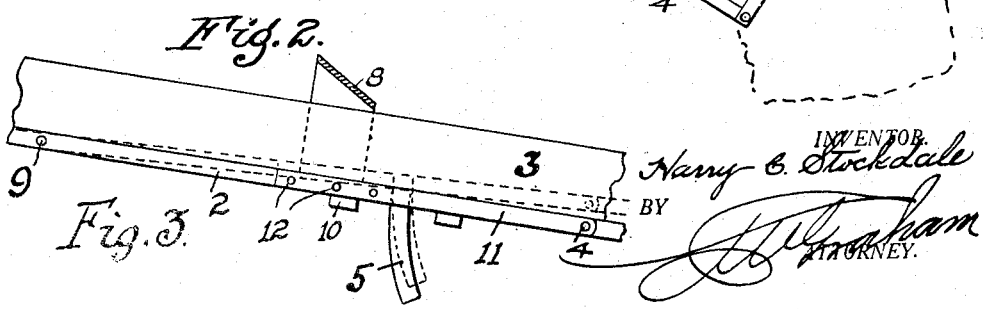

Patented Jan. 21, 1936

2,028,297

UNITED STATES PATENT OFFICE 2,028,297

APPARATUS FOR BAGGING ROLLABLE ARTICLES

Harry C. Stockdale, Ravenna, Ohio, assignor to Food Machinery Corporation, San Jose, Calif., a corporation of Delaware Application March 10, 1933, Serial No. 660,296

8 Claims. (Cl. 226—47)

This invention relates to an apparatus for bagging fruits or vegetables but is particularly adapted to the bagging of potatoes in small bags holding about a peck of potatoes weighing about fifteen pounds.

The packing of potatoes in fifteen pound bags, which is about a peck, is becoming quite popular with householders and the bagger disclosed by this application is designed to handle this style of bagging in the most efficient and practical manner.

The bagger is portable so that it can easily be placed in operative relation with any type of potato handling equipment in the packing houses and is so arranged and manipulated that an efficient and fast operator can bag as rapidly as he is capable.

The stream of potatoes coming from the cleaning or grading machines is under the bagger's complete control and is caused to flow or stop at his convenience so that speed of operation is dependent only on his ability for fast work.

Briefly the bagger comprises a tilted chute down which a stream of potatoes may flow. The bagging end of the chute is pivoted and carries a metal rectangular shaped band as a means for attaching the bag during the filling operation. A lifting of the end of the pivoted chute releases the flow of potatoes which slide down the chute and fill the small bag held in position by the operator, almost instantly, then a simple tilting of the chute with the bag held over the mouth instantly stops the flow of potatoes and the filled bag may be lifted from the mouth of the chute and placed at one side for further attention by an operator who weighs the bag and then closes it.

The rear end of the tilting chute carries a depending curved apron of wood or other suitable material that rises up into the path of the flow of potatoes and stops their movement and permits them to accumulate so that when another bag is positioned for filling there is a bulk of potatoes substantially sufficient to fill the bag instantly when the chute is raised to release the accumulation. The natural incline of the chute being such that the pile of potatoes will slide quickly when they are released.

It is therefore an object of the invention to provide an apparatus for bagging potatoes wherein the flow of potatoes is controlled by the operator.

It is also an object of the invention to provide a machine for bagging potatoes having means for accumulating a charge of potatoes for insertion in a positioned bag.

It is also an object of the invention to provide a bagging device that permits the mouth of the bag to be stretched around a filling chute and held by the operator while the bag is filling.

It is a further object of the invention to provide a bagging device that is a self contained portable unit that may be easily attached to any type of potato handling equipment.

With such objects in view as well as other advantages which may be inherent in the invention it is understood that the several necessary elements and combinations as set forth may be varied somewhat in their placement and arrangement without departing from the scope and nature of the invention, and in order to make the invention more clearly understood there are shown, somewhat diagrammatically, in the accompanying drawing, means and mechanism for placing the invention in a preferred form, without limiting the isprovements to the particular construction shown to illustrate the invention.

Figure 1 is a perspective of the device with portions broken away to show the operative mechanism.

Figure 2 is a side elevation of the device with parts broken away to more clearly show the device.

Figure 3 is a view similar to Figure 2 but showing a modified structure wherein the entire bottom of the chute is movable under certain conditions.

Any kind of a suitable frame work may be provided to support the device and there are shown in the drawing simple legs 1. The chute 2 is moved into engagement or operative relation with the discharge of any potato or other machine for handling rollable articles and the inclined sides 3 converge the flow of potatoes to a somewhat restricted zone. The bottom board of the upper end of the chute is fixed with the sides but the lower bottom board of the chute is pivoted to the sides 3 at 4, and carries the depending apron 5 on its rear end, which, when positioned as in Fig. 2 acts as a valve to stop the flow of potatoes while a bag is being positioned as shown by dotted lines in Fig. 2. When the positioned bag and the tilting bottom board 6 are positioned as in Fig. 1 the accumulated pile of potatoes back of the valve arm 5 will immediately slide down into the bag and fill it almost instantly, unless the accumulation has been insufficient when the bag will be held in position while additional articles roll down the chute.

The means for properly locating the mouth of the bag comprises the rectangular band 7 secured to the end of the tiltable bottom board 6.

In order to prevent the accumulating potatoes from jumping over the pendent valve 5 when in the position of Fig. 2 a flexible strip of suitable material, such as a piece of canvas, is stretched across the top of the chute as at 8.

This flexible strip 8 may be placed as near to the valve 5 as is found necessary. In the drawing it is shown as set back from the valve and this position has been found satisfactory where the device has been used, but it may be found necessary to place it so the lower edge will just overlie the top edge of the valve 5, as indicated by the dotted lines in Fig. 2.

In the operation of this device the operator takes a bag and stretches the open mouth over the band 7 while the tilting chute board is in the position of Fig. 2. During this operation potatoes are rolling down the chute and accumulating back of the valve 5. As soon as the bag is positioned the operator lifts it with the lowered end of the tiltable chute 6 into the position of Fig. 1 when the accumulated potatoes back of the valve 5 will be released and will immediately flow down into the positioned bag. From constant practice the operator soon learns by the weight in the bag that he is holding when the bag has the desired amount and the expert operators can tell within two or three potatoes of the correct weight. As soon as the desired weight is in the bag the chute 6 is tilted to the position of Fig. 2 when the flow of potatoes is stopped and accumulation begins back of the valve 5 for the next bag. The filled bag is then handed to another operator who checks the weight on suitable scales and adds to or takes from the bag as may be necessary to get the proper weight, this operator then closes the bag by tying or otherwise.

Figure 3 shows an alternative construction that is at times advisable and especially where large potatoes or fruit are being handled.

The large articles sometimes tend to bunch and pack under the flexible member 8 while the member 6 is in the position of Figure 2, so that when the small bag is positioned over the form 7 and the member 6 is lifted to position Figure 1 the bunching of the articles under the flexible member 8 blocks the flow so that it is desirable that the operator have some means to jiggle them loose so they will flow into the positioned bag.

This jiggling is accomplished by lifting the entire bottom of the chute board 2 as shown in the dotted lines of Figure 3.

This chute board 2 being pivoted at 9 and normally resting on the cross member 10 and being pivotally connected to the member 6 by the side irons 11 being secured at 12 to the side of 2 and the iron 11 being pivoted at 4 enables the entire bottom of the chute to be jiggled as the operator desires when the articles stick and do not flow freely.

Throughout the specification potatoes and the like have been referred to but applicant wants it understood that many other materials such as cereals, fruits of various kinds and in fact any material that will roll or slide down an inclined chute may be bagged by the invention.

What I claim as new and desire to secure by Letters Patent is:

1. An apparatus for bagging potatoes or any rollable articles comprising an inclined chute to receive a stream of potatoes, a tiltable member at the discharge end of said chute having a depending flange to stop the stream of potatoes and means on said tiltable member for positioning the open end of a bag, the tilting of said tiltable member moving said flange to permit potatoes to flow into said positioned bag.

2. An apparatus for bagging potatoes or rollable articles comprising a chute for guiding a stream of articles, a pivoted member at the discharge end of said chute having a cut-off flange at one end and a bag holder at the other end, whereby lowering of the bag holder end brings the said cut-off flange across the chute to stop the flow of articles and raising the bag holder end causes the flange cut-off to lower and release the flow of articles to deposit in a bag at said end.

3. An apparatus for bagging potatoes or rollable articles comprising a chute for guiding a stream of articles, a pivoted member forming the bottom of said chute at the discharge end and carrying a cut-off flange to form a gate in said chute to stop the flow of articles along said chute when said pivoted member is moved about its pivot, a retarding member placed across the top of the chute adjacent the top edge of said flange to prevent the accumulating articles from overriding the said flange, the lifting of the outer end of said pivoted member removing the cut-off flange from across the chute and releasing the flow of articles.

4. An apparatus for bagging rollable articles comprising a chute along which rollable articles may pass, a tiltable extension along said chute having a depending flange for intercepting the flow of articles therealong to accumulate a charge of articles therein, means for positioning the open end of a bag on said tiltable means so that when said tiltable means is moved to release the accumulated charge it will roll into said positioned bag.

5. An apparatus for bagging rollable articles comprising a guideway along which rollable articles may pass, swingable means along said guideway for intercepting the flow of articles therealong and accumulating a charge of articles, said swingable means having a depending flange and forming a part of said guideway, means for positioning a bag to receive said accumulated charge when released by said swingable means.

6. An apparatus for bagging rollable articles comprising a chute for guiding a stream of articles, a section of said chute at the discharge end being pivoted and having a bag holder on one end and a cut-off valve on the other, the swinging of said section about the pivot, raising said valve up to intercept the flow of articles and cause them to accumulate back of the valve, a retarding member placed across the chute adjacent said valve to prevent the accumulating articles from overriding said valve, the placing of a bag on the said bag holder and raising said chute section acting to withdraw the valve from said raised position and release the flow of articles into the positioned bag.

7. An apparatus for bagging potatoes comprising a chute along which a stream of potatoes may flow, a tiltable bottom in said chute, a pendent arm attached to said tiltable bottom and adapted to intercept the flow of potatoes along said chute when said tiltable bottom is in one position and to permit uninterrupted flow when tilted to another position with means on said tiltable bottom to position a bag to receive the flow of potatoes when said bottom is tilted to permit uninterrupted flow.

8. An apparatus for bagging potatoes comprising a chute along which a stream of potatoes may flow, a tiltable section in the bottom of said chute being pivoted to the sides thereof and carrying on one end a pendent arm that intercepts the flow of potatoes along said chute when tilted from normal, and carrying on the other end means for positioning a bag or receptacle to receive the stream of potatoes when the flow is uninterrupted and the tiltable section is in normal position.

HARRY C. STOCKDALE.